(12) United States Patent
Takanuki et al.

(10) Patent No.: US 7,453,670 B2
(45) Date of Patent: Nov. 18, 2008

(54) SUSPENSION HOLDER PALLET

(75) Inventors: Kazuaki Takanuki, Tokyo (JP); Osamu Shindo, Tokyo (JP); Akimasa Nakao, Tokyo (JP); Satoshi Yamaguchi, Tokyo (JP)

(73) Assignees: TDK Corporation, Tokyo (JP); SAE Magnetics (H.K.) Ltd., Shatin (HK)

( * ) Notice: Subject to any disclaimer, the term of this patent is extended or adjusted under 35 U.S.C. 154(b) by 349 days.

(21) Appl. No.: 10/997,901

(22) Filed: Nov. 29, 2004

(65) Prior Publication Data

US 2005/0117254 A1    Jun. 2, 2005

(30) Foreign Application Priority Data

Dec. 2, 2003   (JP)   ............... 2003-402451

(51) Int. Cl.
*G11B 5/54*   (2006.01)
*G11B 3/00*   (2006.01)

(52) U.S. Cl. ..................... 360/254.3; 360/137
(58) Field of Classification Search ................. 360/137, 360/254.3, 254.5, 255.2, 254.2, 254.4, 254.6, 360/255.4, 255.8, 255.9
See application file for complete search history.

(56) References Cited

U.S. PATENT DOCUMENTS

| | | | | |
|---|---|---|---|---|
| 4,644,429 A | * | 2/1987 | Boe ...................... | 360/255.2 |
| 4,956,733 A | * | 9/1990 | Dalziel ................... | 360/255.2 |
| 5,826,325 A | * | 10/1998 | Price et al. ............... | 29/603.03 |
| 5,831,795 A | * | 11/1998 | Ma et al. ................. | 360/254.3 |
| 6,452,753 B1 | * | 9/2002 | Hiller et al. ............. | 360/254.7 |
| 6,473,268 B2 | * | 10/2002 | Simozato ................ | 360/254.3 |
| 6,859,995 B2 | * | 3/2005 | Kamigama et al. ....... | 29/603.01 |
| 7,159,299 B1 | * | 1/2007 | McMunigal et al. ..... | 29/603.03 |
| 2001/0033459 A1 | * | 10/2001 | Boutaghou ............... | 360/254.3 |
| 2006/0117558 A1 | * | 6/2006 | Koh et al. ................... | 29/737 |

FOREIGN PATENT DOCUMENTS

JP    8-96541    4/1996

OTHER PUBLICATIONS

Patent Abstracts of Japan; 04017174 A; Jan. 21, 1992.
Patent Abstracts of Japan; 2003257140 A; Sep. 12, 2003.
Patents Abstracts of Japan; 11328894 A; Nov. 30, 1999.

* cited by examiner

*Primary Examiner*—Brian E. Miller
*Assistant Examiner*—Matthew G Kayrish
(74) *Attorney, Agent, or Firm*—Oblon, Spivak, McClelland, Maier & Neustadt, P.C.

(57) ABSTRACT

A pallet main body is provided with a block holding member which presses a positioning surface of an actuator block against a block reference surface formed in the pallet main body, and a movable arm. An insertion member, which can be inserted between a plurality of opposing suspensions, is formed at a distal end of the movable arm. As a suspension to which a slider is to be attached contacts a first contact surface formed on the side in contact with this suspension, a distal end of the suspension to which the slider is to be attached is held at a prescribed height from the block reference surface, thereby forming a gap between this suspension and a suspension opposed to this suspension.

5 Claims, 4 Drawing Sheets

SUSPENSION HOLDER PALLET

BACKGROUND OF THE INVENTION

1. Field of the Invention

The present invention relates to a suspension holder pallet, in particular, a suspension holder pallet suitable for use in the post-mounting of a slider to a suspension attached to an actuator block.

2. Related Background Art

Discussion of Background

Hard disk drives (hereinafter called HDDs) are increasing in capacity and being made thinner. Together with those advances, magnetic heads (20%, 30% sliders) are also being made smaller.

When bonding a slider, on which a giant magneto-resistive (GMR) element is formed, to a suspension with conventional processes of manufacturing magnetic heads, positioning of the slider is performed first using the external shape of the slider as a reference. An adhesive agent is applied to a rear surface side of the slider (side opposite to a side where an air bearing surface (ABS) is formed) after positioning the slider, and the rear surface side of the slider is made to contact a distal end of the suspension, which has been positioned by using a tooling hole or the like. The slider and the distal end of the suspension are bonded together through the adhesive agent. It should be noted that a suction nozzle slightly smaller than the surface area of the slider is generally used in moving the slider to the distal end of the suspension.

After bonding the slider and the suspension, thus forming a head gimble assembly (HGA), the HGA is assembled together with an actuator block, forming a head stack assembly (HSA) (refer to JP 4-17174 A (FIGS. 4A, 4B and FIG. 5), for example).

However, problems like those described below exist with the conventional magnetic head manufacturing methods described above.

To elaborate, the processing time is long because the slider undergoes the process for assembling the HSA after undergoing the process for assembling the HGA. A fear thus exists that elements within the slider may be damaged due to such factors as electrostatic discharge (ESD) or the like. When a non-defective slider at the HGA assembly state becomes defective during processing, the defects in the slider are discovered after HSA assembly. Finished product yield consequently decreases, with increases in cost.

Methods in which the suspension and the actuator block are assembled in advance, and then the slider is attached to the slider through post-mounting have been considered in order to resolve problems like those described above. However, a pair of suspensions that sandwich a magnetic disk face each other in the HSA. With a method in which the slider is attached to one suspension from a vertical direction by using a conventional suction nozzle, there is a problem in that the suction nozzle interferes with the other suspension facing the one suspension, making it impossible to attach the slider.

In the HSA state, a tooth-like jig called a comb is inserted between magnetic head suspensions, thus preventing contact between opposing magnetic head sliders. The following construction may be adopted to this end. That is, first, the suspensions are attached to an actuator block (with no slider mounted), and the comb is inserted between the opposing suspensions. After forming a gap between the distal ends of the suspensions by thus inserting the comb, the slider is attached to the distal end of each suspension. However, a comb is generally used simply for preventing contact between opposing magnetic head sliders, and hence applying it to implementations that involve post-mounting of a slider to a suspension will result in the following problem. That is, the distal end height of the suspension to which the slider is to be mounted is not maintained constant (e.g. relative to a mounting reference surface of the actuator block). When mounting the slider to the distal end of the suspension, an excessive load may be applied on the slider or the force with which the slider is pressed against the suspension distal end may become insufficient due to the resulting variations in the distal end height of the suspension.

Incidentally, there is a demand for improved efficiency in the production of HSAs, which are mass-produced according to the number of HDDs manufactured.

When, to this end, regulation of the distal end position of the suspension to which the slider is to be attached is performed on the device main body side where the slider is attached, without using the comb, the operation of removing the comb from the gap between the suspensions must be performed on the device main body side. This comb removal operation may add complexity to the equipment used and also cause a reduction in production efficiency.

SUMMARY OF THE INVENTION

The present invention has been made in view of the prior art problems described above. An object of the present invention is to provide a suspension holder pallet which enables efficient post-mounting of a slider even when a suspension and an actuator block are previously assembled together.

The present invention has been made based on the finding that the time required for removing a comb, the time required for effecting positioning, and the like in an apparatus to which a slider is to be attached can be reduced by: removing the comb, which is inserted between a plurality of suspensions attached to an actuator block, in advance prior to mounting of the slider; and effecting accurate positioning on the distal end height of a suspension to which the slider is to be attached, thereby achieving improved production efficiency.

That is, a suspension holder pallet according to the present invention relates to a suspension holder pallet for holding at a preset height a distal end of a suspension attached to an actuator block, and attaching a slider constituting a magnetic head to the distal end of the suspension, the suspension holder pallet including: block holding means provided in a pallet main body, for pressing a positioning surface of the actuator block against a block reference surface formed in the pallet main body; a movable arm provided in the pallet main body; an insertion member which is formed at a distal end of the movable arm and can be inserted between a plurality of opposing suspensions; and a first contact surface formed on a side in contact with the suspension to which the slider is to be attached, in which the distal end of the suspension to which the slider is to be attached is held at a prescribed height from the block reference surface through contact of the suspension with the first contact surface, forming a gap between the opposing suspensions.

It is desirable that a second contact surface be formed on a side of the insertion member opposite to the side where the first contact surface is formed, the second contact surface being adapted to hold at a prescribed height from the block reference surface a distal end of the suspension opposed to the suspension to which the slider is to be attached, maintaining the gap between the opposing suspensions at a preset value. Further, it is desirable that a movement preventing mechanism be provided between the movable arm and the pallet main body, the movement preventing mechanism being adapted to prevent the insertion member from dislodging from the gap between the plurality of suspensions.

Further, it is preferable that: the plurality of opposing suspensions attached to the actuator block be held by a comb in a state in which the plurality of opposing suspensions are spaced apart from each other, the comb having a projecting portion fitted into a hole portion formed in one of the suspension and the actuator block, and a claw portion which is inserted into the gap between the plurality of opposing suspensions by rotating about the projecting portion; a turning radius of the insertion member be regulated such that a trajectory along which the insertion member is turned by the movable arm overlaps the claw portion; the claw portion inserted between the suspensions be pushed out by the insertion member by turning the movable arm while holding the plurality of opposing suspensions in the state in which the plurality of opposing suspensions are spaced apart from each other; and the insertion member be inserted into the gap between the plurality of suspensions. Further, it is desirable that a rotation center of the movable arm be set at a position in a vicinity of a straight line connecting between a turning center of the actuator block and the hole portion.

According to the above construction, first, the positioning surface of the actuator block with the suspensions attached is pressed against the block reference surface formed in the pallet main body. The intimate contact between the block reference surface and the positioning surface is maintained by using the block holding means such as a clamp.

After thus holding the actuator block onto the pallet main body, the movable arm formed in the pallet main body is rotated, inserting the insertion member formed at the distal end of the movable arm into the gap between the opposing suspensions. The first contact surface and the second contact surface are formed in the portions of the insertion member on which the suspensions abut. By abutting the suspensions on those contact surfaces, the distal ends of the suspensions can be set at prescribed heights relative to the pallet main body taken as the reference position, and moreover the size of the gap formed between the distal ends of the opposing suspensions can be set with accuracy. Therefore, when the slider is inserted into the gap by an external apparatus with the pallet main body taken as the reference position, the slider can be attached to the distal end of the suspension with reliability without causing interference between the slider and the suspensions.

The movement preventing mechanism is provided between the pallet main body and the movable arm provided on the pallet main body. Therefore, the insertion member does not dislodge from the gap between the suspensions even when an external force such as impact is applied to the pallet main body, thereby preventing contact between the distal ends of the opposing suspensions.

The comb having the claw portion is fitted between the suspensions until immediately before the insertion of the insertion member. The comb is used only for separating the distal ends of the opposing suspensions from each other. By bringing the distal end of the insertion member into intimate contact with the claw portion through rotation of the movable arm, and then pushing out the claw portion, which has been previously inserted into the gap between the suspensions, from the gap between the suspensions by the insertion member, the distal ends of the suspensions can be accurately held at the preset heights without involving contact between the distal ends of the suspensions. Note that when the rotation center of the movable arm is set at a position in the vicinity of the straight line connecting between the turning center of the actuator block and the hole portion, variations in the relative position between the claw portion and the insertion member, which occur during the pushing out of the claw portion, can be suppressed, enabling smooth insertion of the insertion member into the gap between the suspensions.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
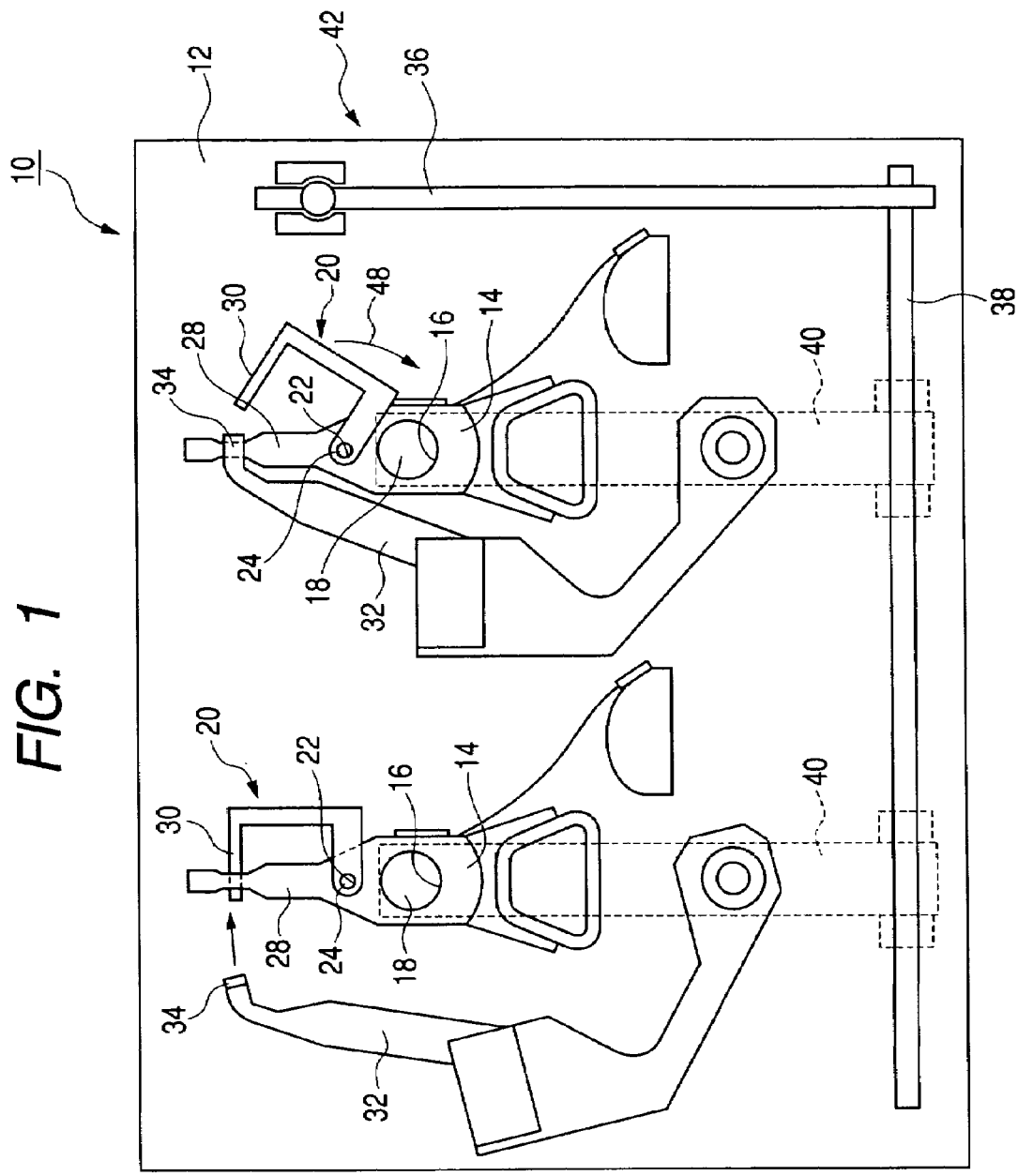
FIG. 1 is a front view showing how a suspension holder pallet 10 according to an embodiment of the present invention is used.

Hereinbelow, specific preferred embodiments of a suspension holder pallet according to the present invention are described in detail with reference to the drawings. FIG. 1 is a front view showing how a suspension holder pallet 10 according to an embodiment of the present invention is used. As shown in FIG. 1, the suspension holder pallet 10 according to this embodiment has a planar pallet main body 12 as its base, with various components being mounted on the pallet main body 12 to constitute the suspension holder pallet 10.

The pallet main body 12 has a size large enough to arrange two actuator blocks 14, each attached with suspensions, side by side on the pallet main body 12. Provided in the central portion of the pallet main body 12 is a positioning pin 18 which is fitted in a mounting hole 16 formed in each of the actuator blocks 14. During assembly onto a hard disk, a bearing is inserted into the mounting hole 16 formed in the actuator block 14, and thus the mounting hole 16 is machined to a very high precision with respect to its inner diameter. Accordingly, by fitting the positioning pin 18 in the mounting hole 16, it is possible to accurately set the mounting position of the actuator block 14 with respect to the pallet main body 12 in the plane direction.

After the actuator blocks 14 are mounted to the pallet main body 12, a lever 36 provided to the pallet main body 12 is rotated, bringing presser plates 40 (indicated by broken lines in the figure) connected to a shaft 38, about which the lever 36 rotates, into contact with upper surfaces of the actuator blocks 14. Thus, the actuator blocks 14 can be reliably fixed onto the pallet main body 12. In this way, by using a clamp mechanism 42 having the lever 36, the shaft 38, and the presser plates 40 and serving as block holding means, a positioning surface 46 formed in the actuator block 14 can be brought into intimate contact with a block reference surface 44 formed in the pallet main body 12 by means of a simple structure (see FIG. 2).

A tooth-like member, herein referred to as a comb 20, is previously attached to each actuator block 14. The comb 20 has a projecting portion 24 that can be fitted into a hole portion 22 formed in the actuator block 14, and a claw portion 30. The claw portion 30, which is rotatable about the projecting portion 24, can be inserted into the gap between a plurality of suspensions 26 and 28 mounted to the actuator block 14, thus preventing contact between the distal ends of the suspensions 26 and 28. Thus, by previously attaching the comb 20 to the actuator block 14, the contact between the distal ends of the suspensions 26 and 28 is prevented.

Further, the pallet main body 12 is also provided with a movable arm 32 whose center of rotation (pivot) lies at a position rearward of the mounting position of the actuator block 14 and on the straight line connecting between the mounting hole 16 and the distal ends of the suspensions 26 and 28 or in the vicinity thereof. Formed at the distal end of the movable arm 32 is an insertion member 34 for insertion into the gap between the suspensions 26 and 28. As the movable arm 32 rotates, the insertion member 34 can be inserted or taken out with respect to the suspensions 26 and 28. Here, referring to FIG. 1, with respect to the actuator block 14 on the left-hand side of the drawing, the position of the movable arm 32 is such that the insertion member 34 is separated from the suspensions, while with respect to the actuator block 14 on the right-hand side of the drawing, the position of the moveable arm 32 is such that the insertion member 34 is inserted into the gap between the suspensions 26 and 28.

As described above, with respect to the actuator block 14 on the right-hand side of FIG. 1, the movable arm 32 is at a position where the insertion member 34 is inserted into the gap between the suspensions 26 and 28. In this regard, it is desirable to provide a movement preventing mechanism (not shown) between the movable arm 32 and the pallet main body 12. The movement preventing mechanism may consist of a ball plunger or the like generally used in the art. Provision of such a movement preventing mechanism makes it possible, even upon application of an external force, to prevent the movable arm 32 from rotating to dislodge the insertion member 34 from the gap between the suspensions 26 and 28.

Further, as shown in FIG. 1, the distal end of the insertion member 34 pushes the claw portion 30 of the comb 20 out from the gap between the suspensions 26 and 28 through the rotation of the movable arm 32. However, it is also possible to form a link mechanism or the like in the movable arm 32, with this link mechanism forcibly rotating the comb 20 in the direction indicated by the arrow 48 when the insertion member 34 is inserted into the gap between the suspensions 26 and 28. When such a mechanism is additionally provided, the retracting motion of the comb 20 can be effected solely through the rotation of the movable arm 32.

Figure 2:
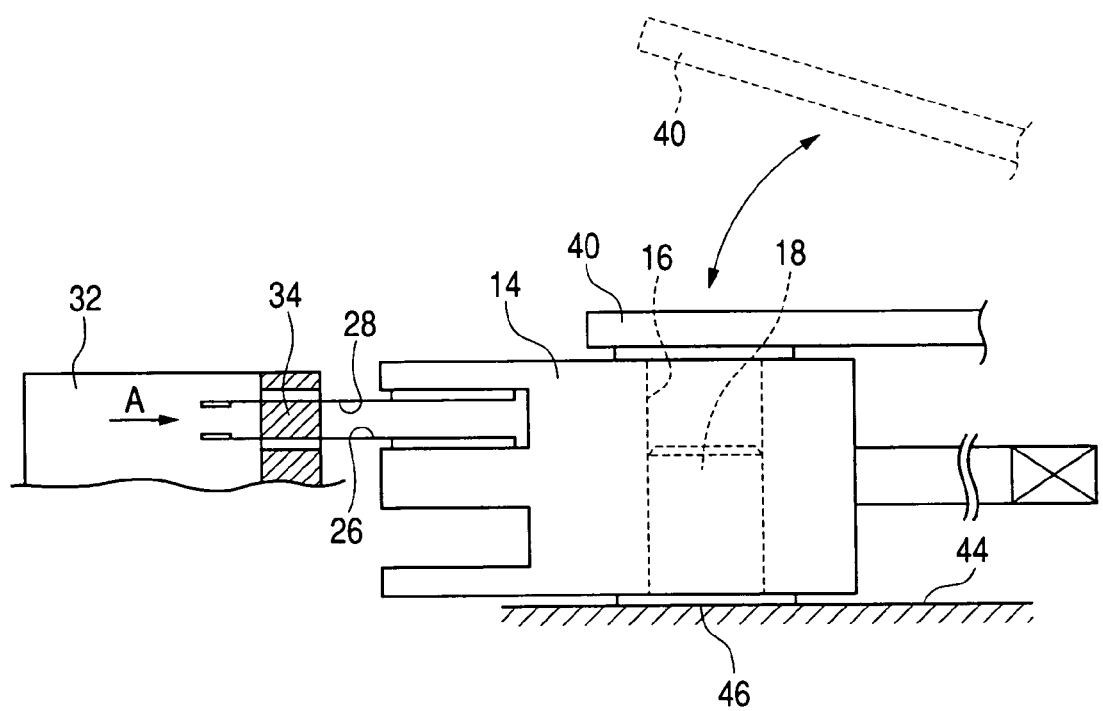
FIG. 2 is a side view showing a state in which an actuator block is mounted to a pallet main body.

FIG. 2 is a side view showing a state in which the actuator block is mounted to the pallet main body.

Referring to FIG. 2, the mounting hole 16 of the actuator block 14 is fitted into the positioning pin 18, and the clamp mechanism 42 is activated to bring the positioning surface 46 formed in the actuator block 14 into intimate contact with the block reference surface 44 formed in the pallet main body 12, thereby making it possible to fix the actuator block 14 onto the pallet main body 12. With the actuator block 14 thus fixed onto the pallet main body 12, the movable arm 32 is rotated, whereby a preset distance can be maintained between the suspensions 26 and 28 by means of the insertion member 34 formed at the distal end of the movable arm 32.

Figure 3:
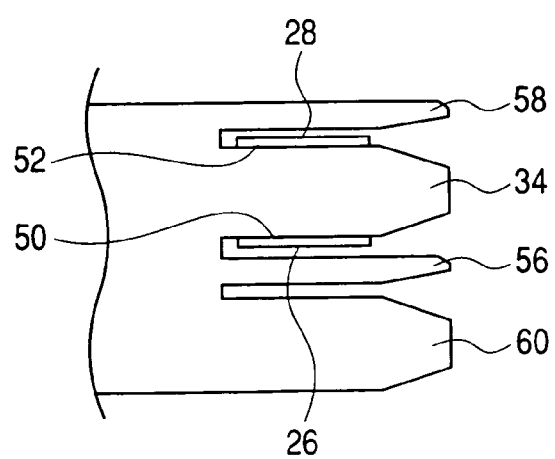
FIG. 3 is a view of an insertion member as seen in the direction of the arrow A of FIG. 2.
Figure 4A:
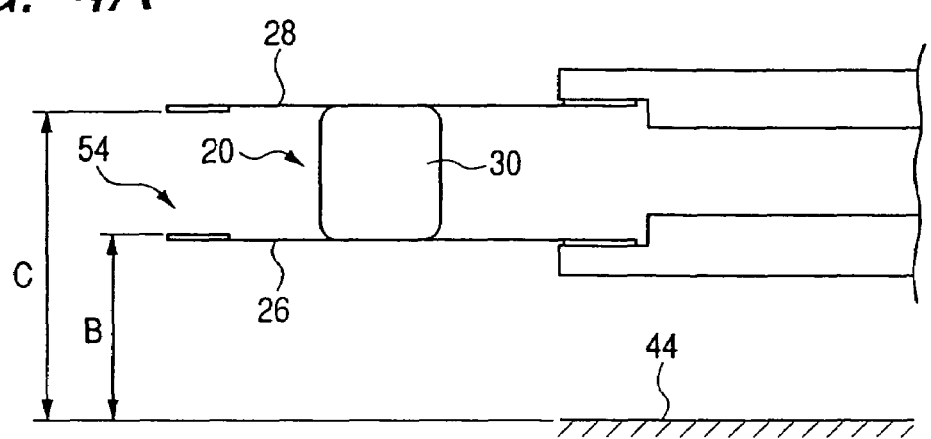
FIGS. 4A and 4B are explanatory diagrams illustrating how suspensions are held by a comb and the insertion member.
Figure 4B:
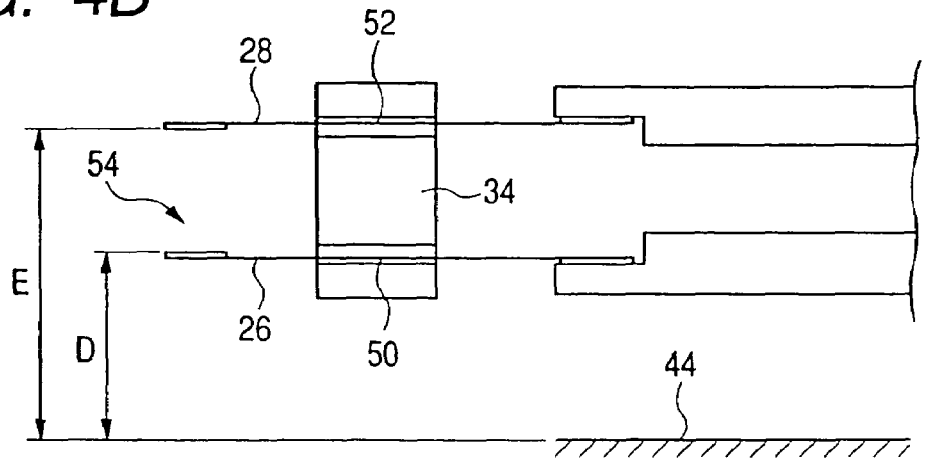

FIG. 3 is a view of the insertion member 34 as seen from the direction of the arrow A of FIG. 2, and FIGS. 4A and 4B are explanatory diagrams illustrating how the suspensions 26 and 28 are held by the comb 20 and the insertion member 34.

The suspension 26 is bent upwardly, while the opposing suspension 28 is mounted facing downward (direction in which the suspensions contact each other). The comb 20 is attached to maintain the distance between the suspensions 26 and 28. The insertion member 34 serves to maintain the distance between the suspensions 26 and 28 with even greater positional accuracy (the dimensions D and B of FIG. 4B) with respect to the mounting heights (the dimensions B and C of FIG. 4A) at which the suspensions are held by the comb 20. This is because when the distal end positions of the suspensions 26 and 28 are not maintained with accuracy, as a slider shuck mechanism for effecting post-mounting of a slider enters a gap 54 between the suspensions 26 and 28, there is a fear that interference may occur between the slider or the slider chuck mechanism and the suspensions 26 and 28, or it may become impossible to mount the slider with accuracy.

To avoid this problem, as shown in FIG. 3, the height of the suspension 26 is set by means of a first contact surface 50 that is positioned with high precision. Likewise, the height of the suspension 28 is set by means of a second contact surface 52 that is positioned with high accuracy similarly to the first contact surface 50. Provided on the respective opposing surface sides of the first contact surface 50 and the second contact surface 52 are guide plates 56 and 58, which are adapted to receive the suspensions 26 and 28 on the sides opposite to the first and second contact surfaces 50 and 52, respectively, to prevent the suspensions 26 and 28 from warping (escaping) in the direction in which they spread apart.

In the state where the insertion member 34 is inserted into the gap between the suspensions 26 and 28, for example, the suspension 26 to which the slider is to be mounted and the first contact surface 50 contact each other while a slight gap is maintained between the suspension 26 and the guide plate 56. Note that another insertion member 60 arranged at a lower position is provided with the case of using an actuator block 14 attached with four suspensions in mind.

By using the suspension holder pallet 10 constructed as described above, the distal end heights of the suspensions can be set with good accuracy, making it possible to effect post-mounting of the slider with reliability.

While in this embodiment the description is directed to the mounting of the slider on the suspension 26 side, the mounting of the slider to the suspension 28 may be performed by using a holder pallet dedicated to the suspension 28.

Figure 5:
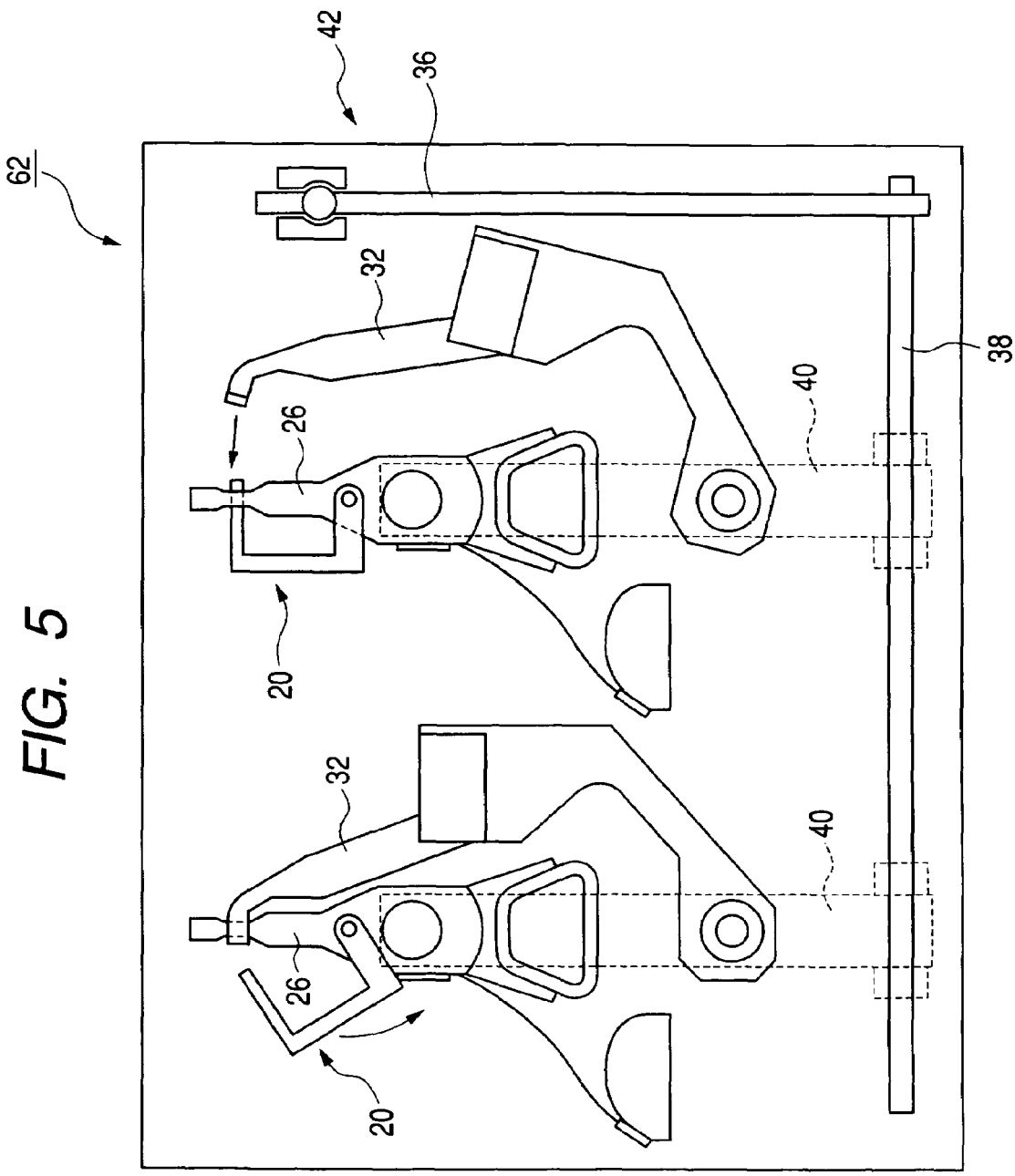
FIG. 5 is a front view showing how a holder pallet dedicated to a suspension 26 is used.

FIG. 5 is a front view showing how a holder pallet dedicated to the suspension 28 is used. As shown in FIG. 5, a holder pallet 62 inverted with respect to the suspension holder pallet 10 shown in FIG. 1 is provided, whereby post-mounting of the slider to the suspension 28 can be performed with ease in the same manner as that to the suspension 26. Note that portions that do not contribute to the mounting of the slider, such as the clamp mechanism 42, may be of the same construction as those of the suspension holder pallet 10.

While in this embodiment the movable arm 32 makes a circular motion about its end portion on the side opposite to the side where the insertion member 34 is formed, this should not be construed restrictively; the direction in which the insertion member 34 is inserted into the gap between the suspensions 26 and 28 may be set as appropriate according to the existing design requirements or the like as long as the comb 20, which is inserted between the opposing suspensions 26 and 28 to prevent contact between the distal ends of the suspensions, can be replaced by the insertion member 34 inserted later (more specifically, as long as the distal end heights of the suspensions can be maintained at preset positions). Specifically, in addition to the circular motion about the end portion of the movable arm, a linear motion in conformity with the extension direction of the claw portion 30 of the comb 20, or a combination of a circular motion and a linear motion using a cam, a link mechanism, or the like may be employed.

As described above, the suspension holder pallet according to the present invention, which relates to a suspension holder pallet for holding at a preset height a suspension attached to an actuator block, and attaching a slider constituting a magnetic head to a distal end of the suspension, includes: the block holding means provided in the pallet main body, for pressing the positioning surface of the actuator block against the block reference surface formed in the pallet main body; the movable arm provided to the pallet main body; the insertion member which is formed at the distal end of the movable arm and can be inserted between the plurality of opposing suspensions; and the first contact surface formed on the side in contact with the suspension to which the slider is to be attached. The distal end of the suspension to which the slider is to be attached is held at the prescribed height from the block reference surface through contact of the suspension with the first contact surface, forming the gap between the opposing suspensions. Therefore, the post-mounting of the slider can be performed efficiently even when the suspensions and the actuator block are assembled together in advance.

This application claims priority from Japanese Patent Application No. 2003-402451 filed Dec. 2, 2003 which is hereby incorporated by reference herein.

What is claimed is:

1. A suspension holder pallet for holding at a preset height a distal end of a suspension attached to an actuator block, and attaching a slider constituting a magnetic head to the distal end of the suspension, the suspension holder pallet comprising:
    a pallet main body;
    a lever having a first end which is rotatably mounted on the pallet main body:
    a shaft which is connected to a second end of the lever;
    a presser member which is connected to the shaft, thereby pressing a positioning surface of the actuator block against a block reference surface formed in the pallet main body;
    a movable arm provided in the pallet main body;
    an insertion member which is formed at a distal end of the movable arm and can be inserted between a plurality of opposing suspensions; and
    a first contact surface formed on a side in contact with the suspension to which the slider is to be attached,
    wherein the distal end of the suspension to which the slider is to be attached is held at a prescribed height from the block reference surface through contact of the suspension with the first contact surface, forming a gap between the opposing suspensions.

2. A suspension holder pallet according to claim 1, further comprising a second contact surface formed on a side of the insertion member opposite to the side where the first contact surface is formed, the second contact surface being adapted to hold at a prescribed height from the block reference surface a distal end of the suspension opposed to the suspension to which the slider is to be attached, maintaining the gap between the opposing suspensions at a preset value.

3. A suspension holder pallet according to claim 1, further comprising a movement preventing mechanism provided between the movable arm and the pallet main body, the movement preventing mechanism being adapted to prevent the insertion member from dislodging from the gap between the plurality of suspensions.

4. A suspension holder pallet according to claim 1, further comprising a comb having:
    a projecting portion fitted into a hole portion formed in one of the suspension and the pallet main body; and
    a claw portion which is inserted into the gap between the plurality of opposing suspensions by rotating about the projecting portion, wherein:
    the comb holds the plurality of opposing suspensions, which are attached to the actuator block, in a state in which the plurality of opposing suspensions are spaced apart from each other;
    a turning radius of the insertion member is regulated such that a trajectory along which the insertion member is turned by the movable arm overlaps the claw portion;
    the claw portion inserted between the suspensions is pushed out by the insertion member by turning the movable arm while holding the plurality of opposing suspensions in the state in which the plurality of opposing suspensions are spaced apart from each other; and
    the insertion member is inserted into the gap between the plurality of suspensions.

5. A suspension holder pallet according to claim 4, wherein a rotation center of the movable arm is set at a position in a vicinity of a straight line connecting between a turning center of the actuator block and the hole portion.

* * * * *